United States Patent

Yrjönen et al.

Patent Number: 5,194,735
Date of Patent: Mar. 16, 1993

[54] METHOD FOR EVALUATING SAMPLE ACTIVITIES IN A MULTIDETECTOR LIQUID SCINTILLATION COUNTER

[75] Inventors: Tapio Yrjönen, Turku; Heikki Kouru, Raisio, both of Finland

[73] Assignee: Wallac Oy, Turku, Finland

[21] Appl. No.: 756,685

[22] Filed: Sep. 9, 1991

[51] Int. Cl.$^5$ .............................................. G01T 1/204
[52] U.S. Cl. ..................... 250/362; 250/364
[58] Field of Search ............ 250/362, 328, 364, 252.1, 250/363.01

[56] References Cited

U.S. PATENT DOCUMENTS

| | | | |
|---|---|---|---|
| 4,652,751 | 3/1987 | Rundt et al. | 250/328 |
| 4,918,310 | 4/1990 | Rundt et al. | 250/328 |
| 5,061,853 | 10/1991 | Lehtinen et al. | 250/328 |
| 5,089,706 | 2/1992 | Kouru | 250/328 |

Primary Examiner—Constantine Hannaher
Assistant Examiner—Richard Hanig
Attorney, Agent, or Firm—Shea & Gould

[57] ABSTRACT

The object of the invention is a method for the evaluation of sample activities in multidetector liquid scintillation counters. According to the invention the memory of said apparatus is provided with a theoretically derived model for each isotope between the counting efficiencies and the quench levels. In addition at least one standard is measured in each detector in order to establish relationships between said theoretical model and each detector. The activities of an unknown sample is evaluated by utilizing said theoretical model and said relationship.

3 Claims, 1 Drawing Sheet

METHOD FOR EVALUATING SAMPLE ACTIVITIES IN A MULTIDETECTOR LIQUID SCINTILLATION COUNTER

BACKGROUND OF THE INVENTION

Liquid scintillation counters are commonly used to measure the count rate or activity of samples containing low energy beta particles or corresponding particles emitting radionuclides such as tritium, iodine-125, carbon-14, sulphur-35, calcium-40 and chromium-51.

The range of the low energy beta particles in the sample is in generally a few tens of micrometers at the most. As a consequence, the sample to be measured has to be placed in direct contact with a scintillation medium by dissolving or suspending the sample within the liquid scintillation medium in a container so that the emitted beta particles can interact with the molecules of the liquid scintillation medium, which comprises a solvent or solvents and a solute or solutes present in a few percent by weight of the solution. In this interaction process most of the kinetic energy of the interacted beta particle is absorbed by the solvent and then transferred to the solute which emits scintillation photons, whose amount is proportional to the energy of the interacted beta particle. These scintillation photons are detected by two, in coincidence operating, photomultiplier tubes producing electric pulses. The sum pulse height is proportional to the energy of the interacted beta particle.

When measuring sample activities with the liquid scintillation counters, the basic problem is the reduction of the counting efficiency due to the quenching of the sample, which can be classified in two main types: the chemical quench and the color quench. The chemical quench is a phenomenom, where the solution formed by the sample and the scintillation medium contains some impurities, which reduce the efficiency of the counting system to detect the emitted beta particles by absorbing them. The color quench is a phenomenom, where the solution formed by the sample and the scintillation medium contains some impurities, which absorb produced scintillation photons. The concequence of this is also the reduction of the counting efficiency.

It is known in the liquid scintillation counting that the reduction of the counting efficiency due to the quenching of the sample can be corrected by a means of a quench curve which describes the relationship between the counting efficiency and the amount of the quench of the sample. Normally liquid scintillation counters are provided with one detector and the quench curve is obtained by measuring a number of standards with identical activities but different quench levels in this detector. Difficulties will be encountered, when a liquid scintillation counter is provided with a plurality of detectors: all standards should be measured in each detector due to the variations in energy and efficiency responses of the detectors, which is a time consuming procedure.

SUMMARY OF THE INVENTION

The object of this invention is to produce a novel method, which differs from the known level of techniques, for the evaluation of sample activities in multidetector liquid scintillation counters. According to this method, apparatus memory is provided with theoretically pre-determined standard curves, which are here called as models, for each isotope. Said models are adjusted for different detectors and counting conditions by measuring only one or two standards in each detector. Thus a remarkable time saving is obtained compared to the known level of techniques.

DETAILED DESCRIPTION OF THE PREFERRED EMBODIMENTS

Figure 1:
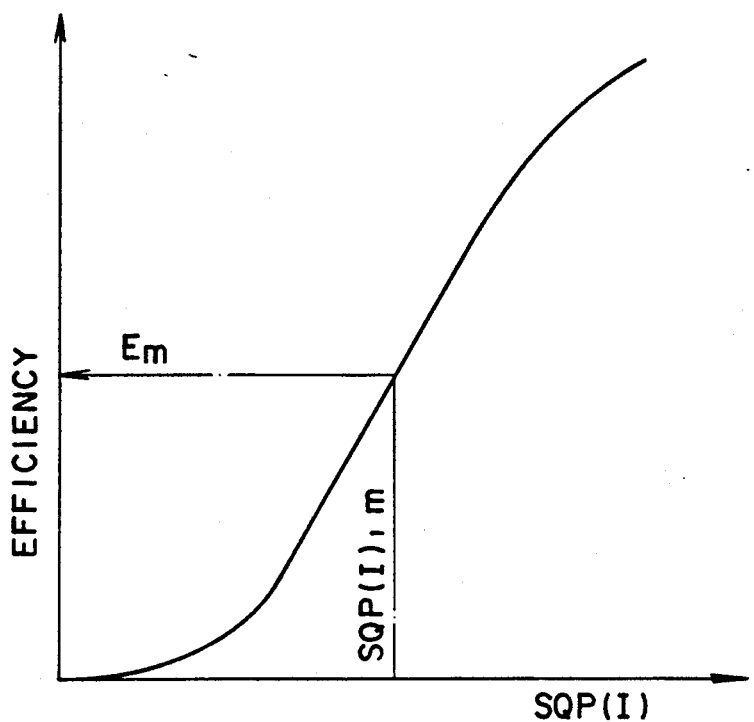
FIG. 1. is a diagram which illustrates a theoretically derived relationship between the counting efficiency and the SQP(I).

The memory of said multidetector liquid scintillation counter is provided for each isotope with a theoretically derived relationship illustrated in FIG. 1 between a quench related quantity called SQP(I) and efficiency. SQP(I) is measure of the spectrum location (the centroid of the spectrum) and varies as the quench changes. It should be understood that—instead of SQP(I)— any other quench parameter can be applied.

Figure 2:
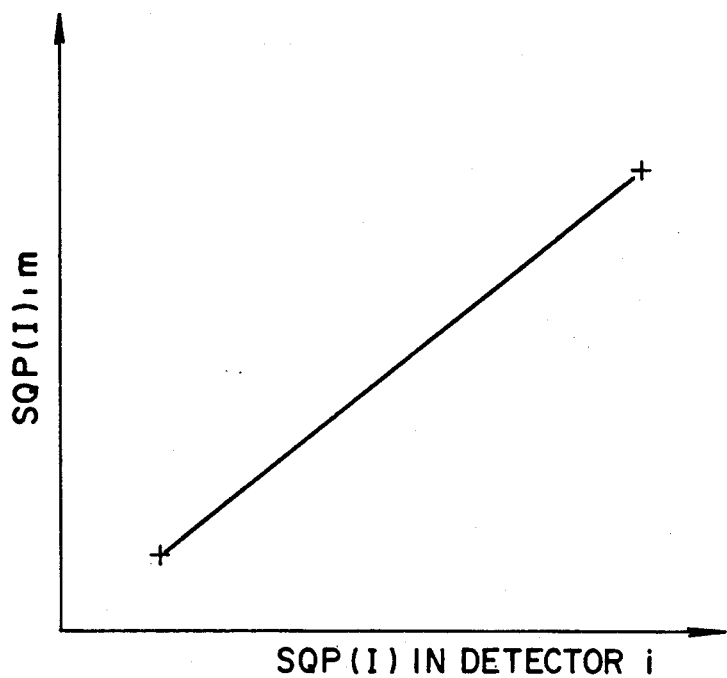
FIG. 2. is a diagram which illustrates a relationship between the SQP(I) in theoretically derived standard curve and the SQP(I) in any detector i.

One, preferably with lowest applied level of quench, or two standards, preferably with lowest and highest applied level of quench, are measured in each detector. The purpose of this is to establish the relationships illustrated in FIG. 2 of SQP(I) values between the theoretical model and each detector. These relationships are stored in the memory of the apparatus. The applicants have observed that these relationships are linear functions so that two points obtained with two standards are sufficient to define them. This means that standard curves have not any remarkable fine structure.

The standardization procedure is the following:
1) The centroid of the spectrum SQP(I)1,i and counting efficiency E1,i of said one standard or the centroids of the spectrums SQP(I)1,i and SQP(I)2,i and counting efficiencies E1,i and E2,i of said two standards are measured in each detector i.
2) Using E1,i- and E2,i-values SQP(I)1,m and SQP(I)2,m are evaluated from the theoretically derived standard curve if two standards are measured or using E1,i-value SQP(I)1,m is evaluated from the theoretical derived standard curve if one standard is measured.
3) The linear relationship between SQP(I)-values of each detector SQP(I),i and the theoretical derived standard curve SQP(I),m is formulated:

$$SQP(I),m = SQP(I)1,m + k*(SQP(I),i - SQP(I)1,i), \quad (Eq. 1)$$

where $$k = (SQP(I)2,m - SQP(I)1,m)/(SQP(I)2,i - SQP(I)1,i),$$

if two standards are applied or $$k = SQP(I)1,m/SQP(I)1,i,$$

if one standard is applied.

The actual sequence of events for evaluating activities of unknown samples is as follows:
1. The SQP(I),i value and count rate of the sample are measured with any detector.
2. The SQP(I),i value is converted using Eq.1 to the SQP(I),m-value.
3. The SQP(I),m value is used as shown in FIG. 1 to read off the efficiency from the theoretically derived standard curve.

4. The measured count rate in the actual detector i is divided by said efficiency to obtain the activity of the measured sample.

The method according to the present invention is not confined to the above description alone, but it may show even considerable variation within the scope of the patent claims.

We claim:

1. A method for evaluating activity of samples in a multidetector liquid scintillation counter, comprising the steps of:

providing a memory of the apparatus with a theoretical model between quench levels and counting efficiencies;

measuring at least one standard in each detector whereby a relationship between quench levels of the theoretical model and each detector is established;

storing said relationship between said theoretical model and each detector in the memory of said multidetector liquid scintillation counter;

measuring a quench level and a count rate of an unknown sample with any detector of the multidetector liquid scintillation counter;

converting the quench level of the unknown sample to correspond to the quench level of the theoretical model by using the relationship of the quench levels of the actual detector and the theoretical model;

using said converted quench level to read the corresponding counting efficiency of the theoretical model by using said relationship of the counting efficiencies and the quench levels in the theoretical model; and dividing the measured count rate in the actual detector by the efficiency to obtain the activity of the sample.

2. Method according to claim 1, characterized by evaluating activities of unknown samples by utilizing said theoretical model and said relationship between said theoretical model and any detector.

3. A method for evaluating activity of samples in a multidetector liquid scintillation counter, comprising the steps of:

providing a memory of the apparatus with a theoretical model between quench levels and counting efficiencies;

measuring at least one standard in each detector whereby a relationship between the theoretical model and each detector is established;

measuring a quench level and a count rate of an unknown sample with any detector of the multidetector liquid scintillation counter;

converting the quench level of the unknown sample to correspond to the quench level of the theoretical model by using the relationship of the quench levels of the actual detector and the theoretical model;

using said converted quench level to read the corresponding counting efficiency of the theoretical model by using said relationship of the counting efficiencies and the quench levels in the theoretical model; and dividing the measured count rate in the actual detector by the efficiency to obtain the activity of the sample.

* * * * *